US005800585A

United States Patent [19]
Choi

[11] Patent Number: 5,800,585
[45] Date of Patent: Sep. 1, 1998

[54] SELF-SUPPORTING POCKET FLUID FILTER

[76] Inventor: Kyung-Ju Choi, 8406 Running Spring Dr., Louisville, Ky. 40241

[21] Appl. No.: 832,514

[22] Filed: Apr. 3, 1997

[51] Int. Cl.[6] .................................................. B01D 25/22
[52] U.S. Cl. ........................... 55/483; 55/484; 55/487; 55/525; 55/527; 55/DIG. 12
[58] Field of Search ........................ 55/483, 484, 487, 55/525, 527, DIG. 12

[56] References Cited

U.S. PATENT DOCUMENTS

| | | | |
|---|---|---|---|
| 3,344,590 | 10/1967 | Smith et al. | 55/484 |
| 3,606,740 | 9/1971 | Ballennie | 55/527 |
| 3,691,736 | 9/1972 | Neumann | 55/484 |
| 3,830,042 | 8/1974 | MacDonnell | 55/484 |
| 4,056,375 | 11/1977 | Ringel et al. | 55/483 |
| 4,925,561 | 5/1990 | Ishii et al. | 55/DIG. 12 |
| 5,298,044 | 3/1994 | Sutton et al. | 55/DIG. 12 |
| 5,635,665 | 6/1997 | Kishi et al. | 55/527 |

*Primary Examiner*—Jay H. Woo
*Assistant Examiner*—Minh-Chau T. Pham
*Attorney, Agent, or Firm*—Polster, Lieder, Woodruff and Lucchesi

[57] ABSTRACT

A self-supporting pocket fluid filter wherein layers of pocket forming filter medium are laminated with open-faced filter netting of sufficient rigidity to provide for self-supporting of completed filter pocket members without additional support mechanisms between or inside extended pockets.

16 Claims, 2 Drawing Sheets

SELF-SUPPORTING POCKET FLUID FILTER

BACKGROUND OF THE INVENTION

The present invention relates to a unique and novel pocket fluid filter arrangement and more particularly to a unique and novel structure for supporting filter pockets in a fluid stream.

Pocket type fluid filter structures for filtering particulate matter from a fluid stream have been long known in the filtration art. Various support arrangements for maintaining and supporting the open mouths of pocket filter cartridges to a flow-through header of a filter unit can be found in a number of U.S. Pat. Nos. such as No. 4,009,012, issued to M. Heffler on Feb. 22, 1977; Nos. 4,300,927 and 4,312,927 issued to C. E. Day on Nov. 17, 1981 and Jan. 26, 1982, respectively; and No. 4,325,718, issued to R. B. Burkhead on Apr. 20, 1982. Various arrangements also have been utilized to provide smaller individual pockets in filter units by longitudinally dividing larger pocket filter cartridges by spaced longitudinally extending joining arrangements, such as by adhesives and machine stitched seams, attention being directed to U.S. Pat. Nos. 4,125,219, issued to A. Engen on Nov. 14, 1978, which utilizes longitudinally extending, spaced adhesive strips; No. 4,197,100, issued to H. P. Hausheer on Apr. 18, 1980, which divides a larger pocket member into several smaller pockets and seams opposed walls of each pocket by spaced longitudinally extending needle felting stitches; No. 4,213,771, issued to J-P Guibet on Jul. 22, 1980, which divides each larger pocket member into several smaller ones by spaced, longitudinally extending machine stitches; No. 4,356,011, issued to C. E. Day et al on Oct. 26, 1982, which divides each larger pocket member into several smaller ones by spaced, longitudinally extending, filimentary stays; and, finally to No. 4,854,953 issued to J. Van Weerden et al on Aug. 8, 1989, which provides spaced rows of smaller individual filter pocket or filter bag members comprised of facing filtering material strips joined by spaced longitudinally extending weld seams to enhance self supporting of the filter bags.

These aforedescribed pocket filter arrangements have been comparatively complex and expensive in manufacture, assembly and maintenance, often offering comparatively high resistance to the fluid flow stream, improper pocket inflation and with problems of leakage and tear around joining and dividing pocket seams. Moreover, in many instances dividers, spacers and pocket support members have been required to insure proper filter pocket extension—this, in turn, occasioning limitations on the amount of filter surface area presented to a fluid stream in a given space, hindering uniform fluid flow and increasing pressure drop.

The present invention provides a new, unique and useful, self-supporting pocket fluid filter arrangement which is comparatively economical and straightforward in manufacture, assembly and maintenance, avoiding the complex problems of past structures by providing a self-supporting pocket filter which allows for an increase of the number of pockets and thus the increase of filtration area in a given space without an undesirable increase in pressure drop. Further, the present invention avoids the usage of interfering fluid flow support structures which have been used in past pocket filter arrangements to support pocket filter media members and, at the same time, enhances smooth, uniform fluid flow with a minimum of filter media tear and leakage.

Various other features of the present invention will become obvious to one skilled in the art upon reading the disclosure set forth herein.

BRIEF SUMMARY OF THE INVENTION

More particularly the present invention provides, in a pocket fluid filter including at least one pair of facing, longitudinally extending pocket forming filter media side wall members joined along the longitudinally extending opposed edges thereof and open at at least one end to provide an open pocket end for passage of fluid therethrough and through the filter media side wall members, a self supporting filter pocket comprising: at least one layer of pocket forming filter medium; and, at least one layer of preselectively rigid pocket supporting flow-through netting comformably laminated to at least one face of the pocket forming filter medium to provide self support of the filter medium in pocket shape in a fluid stream to be treated. In addition the present invention provides a unique arrangement of flow-through netting lamination including spaced strands of varying thickness and a preselected geometric presentation of the strands to the line of flow of the fluid stream to be treated.

It is to be understood that various changes can be made by one skilled in the art in one or more of the several parts of the pocket filter arrangement disclosed without departing from the scope or spirit of the present invention. For example, without departing from the scope of the invention, the particular chemical composition and the number of layers of the filter media and the flow-through netting lamination can be changed in accordance with the type of fluid stream to be treated, as can the relative sizes of the spaced strands and the geometric presentation thereof to the line of fluid stream flow. Further, it is to be understood that although the inventive structure of the present invention is particularly adaptable for use in the treatment of dirty gas streams such as dirty air, the inventive structure can be designed to be employed in the filter treatment of other types of fluids as well.

BRIEF DESCRIPTION OF THE DRAWINGS

Referring to the drawings which disclose one advantageous embodiment of the invention.

DETAILED DESCRIPTION OF THE DRAWINGS

Figure 1:
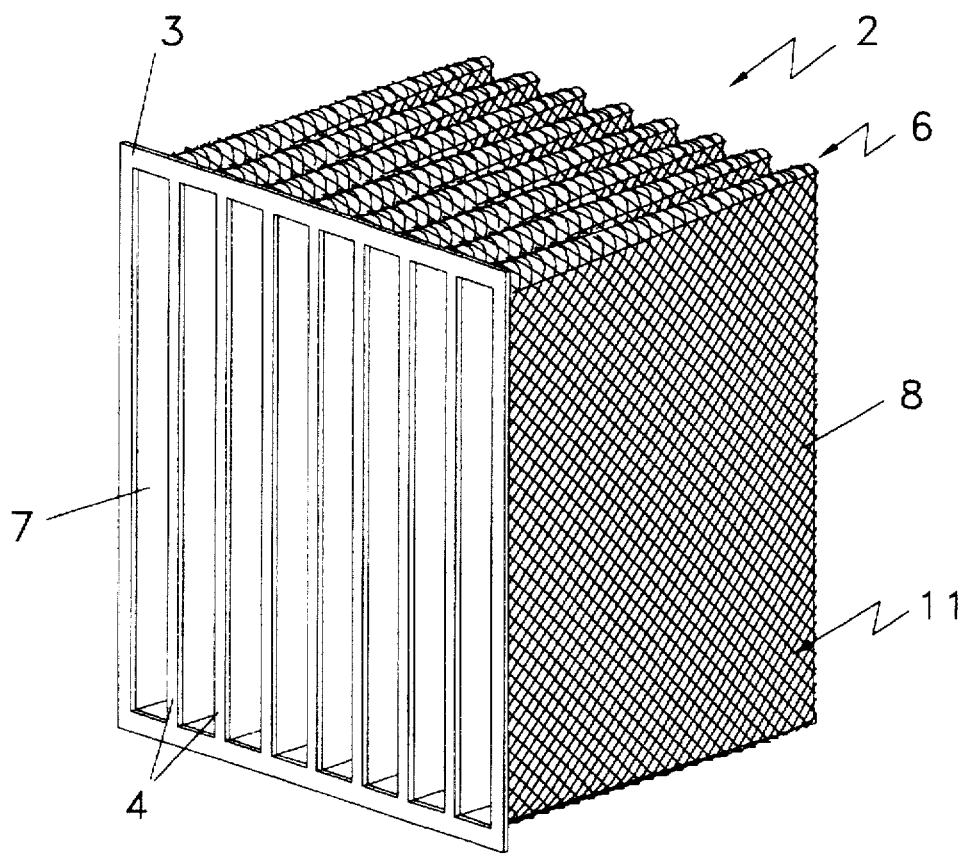
FIG. 1 is an isometric view of the novel self-supporting pocket fluid filter disclosing the rigid laminated netting facing the outside of the filter media pockets with the spaced strand sets normally crossing each other and being positioned at a preselected angle to the longitudinal axis of fluid flow through the open ends of the filter pockets.

As can be seen in FIG. 1 of the drawings, a self-supporting unit pocket fluid filter 2 is disclosed which advantageously can be sized and adapted to filter particulate matter from a dirty gas stream. Unit pocket filter 2 includes an open flow-through, rectangular header 3 including spaced parallel pocket support bars 4 extending from one side of the header to the opposite side, the spaced bars 4 being adapted to sealingly receive the open ends of the novel, self-supporting pocket members 6. It is to be understood that the novel self-supporting pocket members 6, allow for utilization of a maximum number of filter pockets within a given space and accordingly a maximum filtering area without past resistance forming pocket support structure which increases pressure drop, hinders uniformity of fluid flow and creates undesirable fluid turbulence.

Like most pocket filters of the past, each filter pocket 6 includes spaced pairs of facing longitudinally extending pocket forming side wall filter medium members joined by suitable fastening means along longitudinally extending side edges thereof, the pockets being open at first corresponding ends 7 and closed at opposite second corresponding ends 8. It is to be understood that any one of several arrangements known in the art can be utilized to fasten the open ends 7 to spaced, parallel support bars 4 and, in accordance with one feature of the present invention, the laminated rigid netting described hereinafter can be utilized, this netting further serving to join the opposed longitudinal edges of each pocket 6 and to insure the closing of end 8 which is opposite open end 7.

Figure 2:
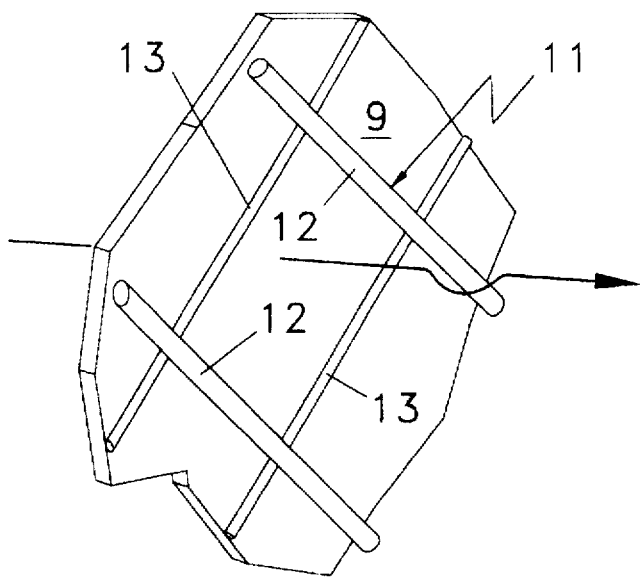
FIG. 2 is an enlarged isometric view of a portion of one face of the pocket filter medium further disclosing laminated thereto a portion of one set of spaced laminated strands crossing a portion of a second set of spaced laminated strands with a differing thickness between the two sets of strands; and, FIG. 3 is an enlarged isometric view of two adjacent faces of two adjacent filter pockets with a portion of the filter medium on one of the pockets being broken away to further showing the crossing strands laminated to the outside face of the filter medium of one of the adjacent faces of one of the adjacent pockets in order to facilitate air passage, the netting on adjacent pocket face being alternatively positioned.
Figure 3:
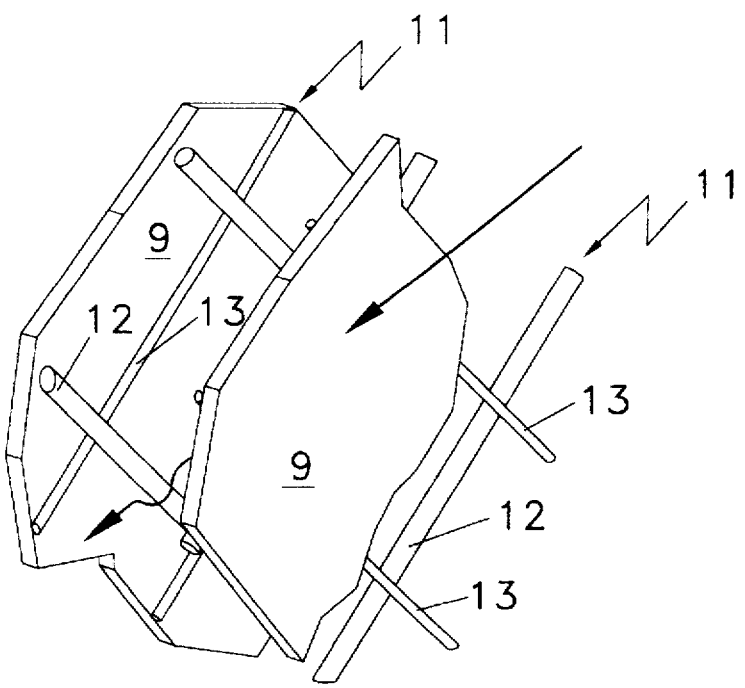

In the disclosed embodiment of the present invention and as can be seen in FIGS. 1-3 of the drawings, each pocket 6 is comprised of one or more longitudinally extending filter medium sheets 9, which advantageously can be a filter medium of glass fibers, synthetic fibers of a combination of both. It is to be understood that other types of filter medium can also be utilized, such as natural fibers or a combination with glass and/or synthetic fibers. Each sheet (or layered sheets) has fastened, or laminated, thereto along at least one face thereof, a sheet of longitudinally extending preselectively rigid open face netting 11, the preselected netting being of sufficient rigidity or stiffness that twenty grams (20 gr.) Gurley thereof is capable of self-supporting at least one ounce per square yard of filter medium. Advantageously, the preselected netting can be of a suitable thermoplastic material, an appropriately sized sheet of which can be heat or adhesive bonded to at least one face of a sheet of filter media. For example, up to eight hundred grams (800 gr) of stiffness as determined by the Gurley stiffness test based on the TAPPI test method T543 pm-84 will support a base weight of media anywhere in the range of one ounce per square yard (1 oz/yd$^2$) up to twenty ounces per square yard (20 oz/yd$^2$) of medium. In this regard, the typical base weight of medium is approximately five ounces per square yard (5 oz/yd$^2$). Accordingly, up to twenty grams of Gurley stiffness will suffice.

In the embodiment of the invention disclosed, a single sheet of filter medium 9 is folded upon itself along with a sheet of bonded laminated netting 11 so as to form the side walls of a pocket member with the bonded laminated thermoplastic netting falling on the outside face of the pocket 6 with each pocket 6 advantageously having an extended length in the range of approximately six to fifty inches (6"-50"). Since the closed end of each pocket member 6 is accomplished with the folding of each laminated sheet, the accompanying folded netting serves to insure the stability of the closed end of each pocket member 6. It is to be understood that each pocket member 6 can have the opposed longitudinally extending edges thereof, which extend from open end 7 to closed end 8, fastened together by fusing the corresponding opposed longitudinal edges of the thermoplastic netting. It, of course, is to be understood that such edges can be fastened by other means known in the art.

In accordance with still another feature of the present invention, the preselectively rigid bonded flow-through netting 11, which serves to allow each filter pocket 6 to be self supported, advantageously is formed from spaced sets of strands 12 and 13 normally crossing each other to be positioned at a preselected angle to the longitudinal axis of fluid flow through the open end 7 of each filter pocket, and, as can be seen in FIGS. 1 and 2 of the drawings, the openings between spaced strands are geometrically arranged to be of diamond shape with the strands being in the approximate range of forty five degrees (45°) up to ninety degrees (90°) angles and advantageously approximately forty-five (45°) degrees to the longitudinal axis of fluid flow through opening 7 of a pocket 6. It is to be understood that the crossing of the spaced strand sets and the geometry of the resulting openings can be preselectively varied in accordance with the filtration treatment environment. For example, if desired, the strands can be so arranged that the openings between spaced strands are of rectangular shape.

In accordance with still another feature of the present invention, and as can be more fully seen in the enlarged FIG. 2 and 3 of the drawings, the thickness of the spaced strand sets can be preselectively varied with one set of spaced strands advantageously each being one tenth of an inch (0.1") thick and the other set of strands each being five one hundredth of an inch (0.05") thick. This difference in strand thickness serves to insure fluid flow between adjacent pockets in the event of undesirable pocket side wall abutment and can also be preselectively utilized to enhance self-supporting pocket strength. It is to be understood that the number of strand sets that are preselected, as well as the preselected same or differing thickness of strands also can be arranged to comply with the fluid filtering demands presented. Further, it is to be understood that, although the netting advantageously is disclosed as being positioned on the outside face of the filter medium of each pocket, in some instances it might be desirable to so position the netting along the opposed inner faces of each pocket. With the unique arrangement as disclosed, previously required spacer mechanisms, either inside each pocket or between adjacent pockets, is avoided and it is possible to obtain a large filter medium area exposure within a given space and thus more pockets within such given space without restricting fluid passage. Finally, it is to be noted, as can be seen in FIG. 3 of the drawings, the netting on adjacent pockets can be arranged in alternative positions to further enhance pocket spacing and concomitant fluid flow.

The invention claimed is:

1. In a pocket fluid filter including at least one pair of facing longitudinally extending pocket forming filter medium side wall members joined along the longitudinally extending opposed edges thereof and open at at least one end to provide an open pocket end for passage of fluid therethrough and through said filter medium side wall members, an integral self-supporting pocket filter comprising: at least one layer of pocket-forming filter medium; and, at least one layer of sufficiently rigid pocket supporting flow-through netting, said netting having sufficient stiffness and sufficient rigidity to support a preselected pocket weight per given unit area and being conformably laminated and facingly bonded to at least one face of said pocket-forming filter medium to provide self-support of said filter medium in pocket shape in a fluid stream to be treated.

2. The self-supporting pocket fluid filter of claim 1, said pair of facing side wall members being joined to provide a closed pocket end opposite said opened end.

3. The self-supporting pocket fluid filter of claim 2, said first layer of pocket-forming filter medium comprising at least one laminated sheet of filter medium and at least one sufficiently rigid netting, said filter medium and netting being folded upon itself to provide said longitudinally extending pocket-forming side wall members with a closed pocket end opposite said open pocket end.

4. The self-supporting pocket fluid filter of claim 1, said sufficiently rigid laminated layer of pocket-supporting netting being on the outside face of said pocket-forming filter medium.

5. The self-supporting pocket fluid filter of claim 1, said sufficiently rigid laminated layer of pocket-supporting netting being of a preselected thermoplastic material bonded to the face of said filter medium.

6. The self-supporting pocket fluid filter of claim 1, said filter medium being composed of glass fibers.

7. The self supporting pocket fluid filter of claim 1, said filter medium being composed of synthetic fibers.

8. The self supporting pocket fluid filter of claim 1, said filter medium being composed of a combination of different preselected fibers.

9. The self-supporting pocket fluid filter of claim 1, said sufficiently rigid laminated netting being a polymeric material.

10. The self-supporting pocket fluid filter of claim 1, said sufficiently rigid laminated netting including sets of spaced strands of preselected thickness crossing each other at preselected angles to the longitudinal axis of said formed pocket.

11. The self-supporting pocket fluid filter of claim 10, said sets of spaced strands substantially normally crossing each other and laminated so as to be positioned at an angle in the range of approximately forty five degrees (45°) to approximately ninety degrees (90°) to the longitudinal axis of fluid flow through the open end of said formed pocket.

12. The self-supporting pocket fluid filter of claim 10, said sets of spaced strands normally crossing each other and laminated so as to be positioned at a forty-five degree (45°) angle to the longitudinal axis of fluid flow-through the open end of said formed pocket.

13. The self-supporting pocket fluid filter of claim 10, said sets of strands being of preselectively differing self-supporting thicknesses.

14. The self-supporting pocket fluid filter of claim 1, said netting having a rigidity sufficient to self-support at least one ounce per square yard (1 oz/yd$^2$) of filter medium.

15. The self-supporting pocket fluid filter of claim 1, said netting having up to twenty grams of Gurley stiffness of sufficient rigidity to support approximately five ounces per square yard (5 oz./yd.$^2$) of filter medium.

16. An integral self-supporting pocket air filter including spaced pairs of facing longitudinally extending pocket-forming side wall filter medium members joined along longitudinally extending side edges thereof, the pockets being open at first corresponding ends and closed at opposite second corresponding ends, with the pockets being fastened at the open ends to an end supporting flow-through frame surrounding the corresponding open ends, each pocket comprising: a longitudinally extending sheet of filter medium having conformably laminated and facingly integrally bonded thereto along one face thereof a sheet of longitudinally extending sufficiently rigid flow-through netting of thermoplastic material formed from spaced sets of strands normally crossing each other to be positioned at a forty-five degree angle to the longitudinal axis of fluid flow-through the open end of a preformed self-supporting pocket formed by folding each sheet upon itself along with said laminated and facingly integrally bonded substantially rigid netting on the outer face of each pocket and with the longitudinally extending edges between open and closed ends joined by fused, laminated netting to provide a self-supporting pocket longitudinally extending to an approximate length in the range of six to fifty inches (6"–50"); with an open end and an opposite closed end, the thickness of one set of spaced strands of the netting being approximately one-tenth of an inch (0.1") and the thickness of the other crossing set of spaced strands being approximately five one hundredth of an inch (0.05") and the netting having up to twenty grams of Gurley stiffness sufficient to support approximately five ounces per square yard (5 oz./yd.$^2$) of filter medium with the netting of adjacent pockets being preselectively and alternatively positioned.

* * * * *